Sept. 27, 1927.
A. M. WISWELL
TRANSMISSION LOCK
Filed April 22, 1926
1,643,480
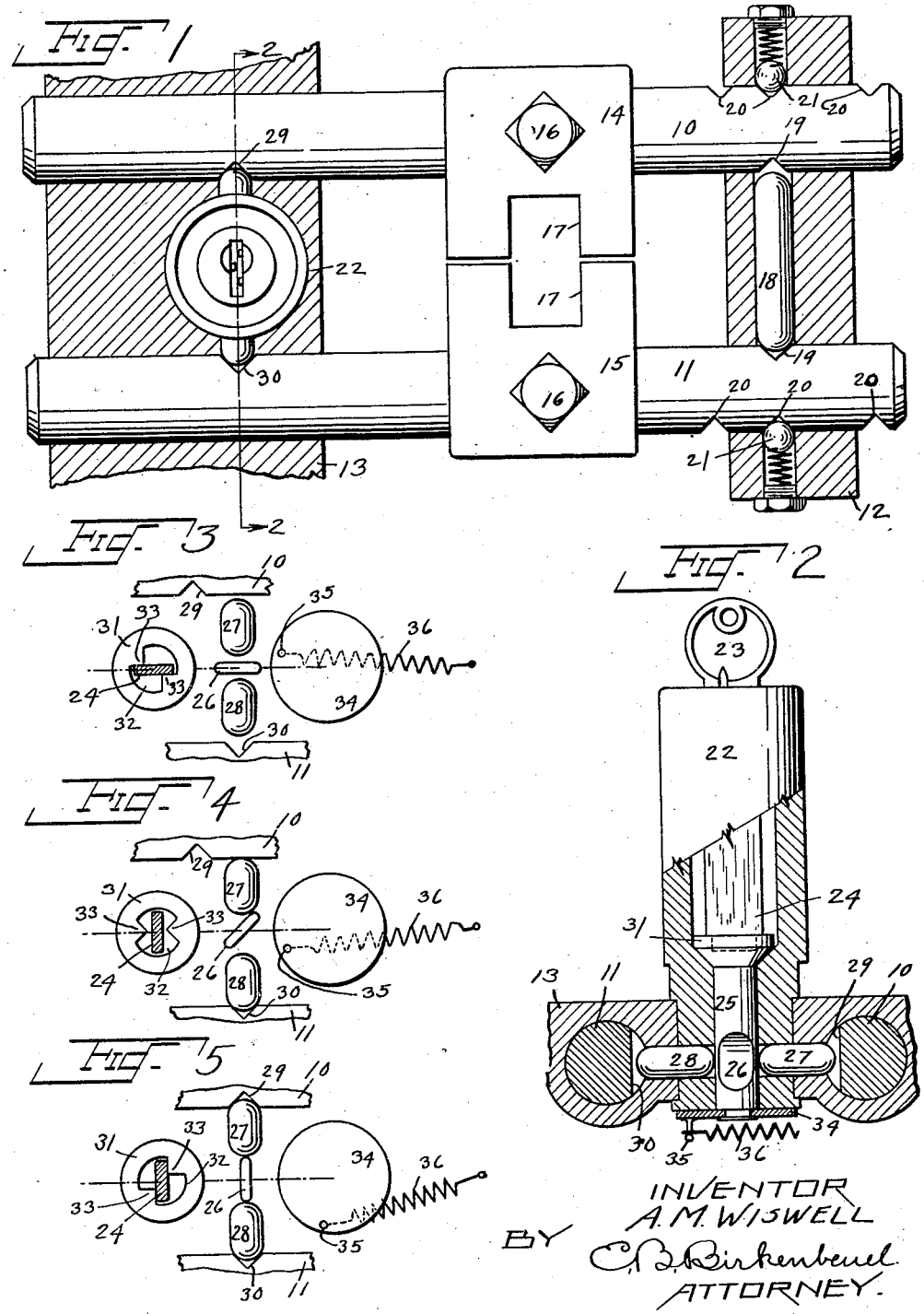

Patented Sept. 27, 1927.

1,643,480

UNITED STATES PATENT OFFICE.

ARTHUR M. WISWELL, OF PORTLAND, OREGON.

TRANSMISSION LOCK.

Application filed April 22, 1926. Serial No. 103,700.

This invention relates generally to locks, and particularly to that type known as transmission locks such as are employed on automobiles.

The main object of this invention is to provide an exceedingly simple and efficient lock for automobiles which will permit the car to be locked when the transmission is in gear, or rather so set that the lock becomes effective as soon as the gear shift lever enters the neutral position, thereby facilitating the use of transmission locks in general and making it possible to leave the car in gear, as when on a hill, in order to reduce the chance of the car getting away due to a release of the emergency brake, either accidentally or otherwise, or to other conditions such as a rising wind, which might be sufficient to start a car in motion if the emergency brake had been set only enough to hold the car on a grade when no wind was blowing.

The second object is to so construct the lock as to make it particularly adapted to use with automatic locking mechanisms, as, for instance, as described in my United States Patent Number 1,570,366 in which the lock is rendered operative whenever the engine is stopped for a pre-determined length of time.

These, and other objects, will become more apparent from the specification following as illustrated in the accompanying drawing, in which:

Figure 1 is a horizontal section through the guides which support the gear shifting shafts and the relation of said shafts to the lock. Figure 2 is a transverse section taken along the line 2—2 in Figure 1. Figure 3 is a diagrammatic plan showing the portion of the gear shifting shafts with the three related elements of the lock shown in laterally disposed position instead of superimposed, and in the unlocked position and with the gear shift lever in the neutral position. Figure 4 is a view similar to Figure 3 showing the parts turned to a locking position awaiting the movement of the shifter shaft into the neutral position, at which time the actual locking operation is to take place. Figure 5 is a view similar to Figure 4 showing the shifter shafts in the neutral position in which they are locked.

Similar numbers of reference refer to the same parts throughout the several views.

Referring in detail to the drawing, for the purpose of illustration only that portion of the transmission is shown which includes the shifter shafts 10 and 11 which are slidably mounted in the guides 12 and 13. Gear shift forks 14 and 15 are secured to the shafts 10 and 11 by means of the usual set screws 16. The gear shift lever which normally occupies space in either or both of the forks 17 of the members 14 and 15 is omitted from the drawing as its functioning is well understood.

Slidably placed in the guide 12 is a plunger 18 between the shafts 10 and 11, which shafts are provided with notches 19 adapted to hold either one or both of the shafts 10 and 11 in the neutral position. The shafts 10 and 11 are also provided with notches 20 which can engage the spring-urged balls 21 in the guide 12 for the purpose of holding the shifting shafts in the correct position for driving, or in the neutral position also.

It is obvious that only one of the shifter shafts can be out of the neutral position at one time.

In the guide 13 between the shafts 10 and 11 is mounted my special lock which consists of the usual outer casing 22 and is provided with a key 23 adapted to rotate a flat shank 24 whose lower end projects into the rotatable shaft 25 having a flattened portion 26 adapted to engage the plungers 27 and 28 which can engage the notches 29 and 30 in the shafts 10 and 11, and thereby lock the transmission in a neutral position.

The upper end 31 of the member 25 is provided with a somewhat circular recess 32 having two inwardly projecting lugs 33 between which the lower end of the shank 24 can be operated. On the lower end of the member 25 is fastened a disk 34 which carries the pin 35 for the spring 36 which is adapted to urge the disk 34 in one way or the other from its central position, such direction being determined by a movement of the key 23.

The operation of the device is as follows: Assuming that the driver of a car wishes to park same on a grade he merely places it in gear, preferably in reverse, and inserts the key 23, which finds the parts in the position shown in Figure 3. He now turns the key, which causes the parts to assume the position shown in Figure 4, and he then moves the key to the position at which it can be withdrawn.

It will now be observed that the shifter shaft 10 in Figures 3 and 4 is not in the neutral position, which makes it impossible for same to lock at that instant. However, the first portion of the movement of the key has turned the disk 34 to a point where its spring will urge it in the opposite direction, which causes the plunger 27 to be urged against the side of the shaft 10.

Before anyone can drive the car to advantage they will, in all probability, place the gear shift in the neutral position, as in Figures 1 and 5, which permits the spring 36 to push the plunger 27 into its notch and the transmission is now locked in the neutral position from which it can be moved only with the aid of the key 23 itself.

It will be seen that when employed without an automatic actuating device for the lock that the undesirable feature of having to place the gear shift in the exact neutral position before locking is possible is eliminated, since the driver need only turn his key to the locked position, after which any movement of the gear shift lever through the neutral position will cause it to lock.

I am aware that many forms of transmission locks have been constructed in the past; I therefore do not claim such devices broadly, but I do intend to cover all such forms and modifications thereof as fall fairly within the appended claims.

I claim:

1. A transmission lock having a pair of plungers adapted to be urged outwardly by the operation of said lock; and a spring mechanism rendered operative by the movement of said lock adapted to completely project said plungers into locking engagement with associated parts when outward obstructions are removed.

2. A transmission lock consisting of a casing; a pair of spaced tumblers mounted in said casing adapted to lock a transmission when projected; a rotatable member having a flat portion thereof between said plungers; and a spring adapted to urge said plungers outwardly by turning said flattened portion of the rod into the plane of the major axes of said plungers.

3. A transmission lock consisting of a casing; a lock within said casing; a pair of slidable plungers placed transversely in said casing; a rotatable rod in said casing having a flat portion between said plungers adapted to move same outwardly; a spring for holding said rod in either extreme direction; and a driving action between said lock and rod adapted to permit the key of the lock to complete its operation which consists in moving said rod away from one extreme position past its center of travel in the opposite direction.

4. A transmission lock having a casing; a pair of transverse plungers mounted in said casing; a rotatable rod having a flat portion between said plungers; a spring adapted to rotate said rod in opposite directions from its center of travel; a lock for actuating said rod; a driving connection between said rod and lock having sufficient lost motion to permit said lock to rotate said rod past its center of travel causing said spring to urge said rod in the same direction when it is impossible to project said plungers and to enable said spring to eject said plungers into the path of associated parts when obstructions to such movement are removed.

ARTHUR M. WISWELL.